Patented Feb. 3, 1953

2,627,464

UNITED STATES PATENT OFFICE 2,627,464

METHOD OF MAKING PREPARED SPROUTED WHEAT CEREAL

Kasper Kehetian, Detroit, Mich.

No Drawing. Application December 17, 1948, Serial No. 65,976

4 Claims. (Cl. 99—80)

This invention relates to cereal products and more particularly to a prepared cereal intended for human consumption such for instance as a breakfast food.

One of the objects of the present invention is to provide an improved prepared cereal made of wheat, which has a novel and very pleasing taste and therefore provides variety to diet.

Another object of the invention is to provide an improved prepared cereal which has a high predigested value and constitutes a very comfortable food for babies particularly when they suffer from hard bowels.

A further object of the invention is to provide an improved prepared cereal which has a high nutrition value and is what may be termed a "quick energy food."

A further object of the present invention is to provide an improved prepared cereal of the foregoing nature, which has greatly increased vitamins and minerals contents as compared with conventional breakfast foods, and therefore constitutes a more balanced and sufficient item of human diet.

A further object of the present invention is to provide an improved prepared cereal which is very nutritious but does not lead to undesirable fatness.

A still further object of the invention is to provide an improved prepared cereal made of wheat by treating the grain and without adding any foreign substance to it except water and some salt for taste.

A still further object of the present invention is to provide an improved prepared cereal made of wheat, which is adapted for canning and for eating cold.

A still further object of the present invention is to provide an improved prepared cereal made of wheat, which can be used as a breakfast food, as pie filling, as a spread for eating with bread, added to muffin, biscuit and bread dough and the like.

A still further object of the invention is to provide an improved method for making a prepared cereal of the foregoing character, which method is simple and inexpensive.

I have found that my improved method gives best results when wheat is used. While other cereals do yield to the same process, the resulting products in their flavor and nutrition value are somewhat lower than in the cereal made of wheat.

In accordance with the invention I provide any desired quantity of wheat and germinate it until the root sprout reaches the length of appr. ½". The germination is effected by soaking the wheat in water overnight (or appr. 24 hours for hard grain) and leaving it at room temperature i. e. appr. 65°–70° F. untiil the grain begins to sprout. In small quantities no particular precaution against overheating etc. are required, but in large quantities the wheat may be first put up into small piles and then spread on concrete floor, and shoveled or turned over as germination progresses in order to prevent overheating, moulding, and to ensure uniform germination.

When the root sprout reaches the length of appr. ½", the stem usually reaches the length of appr. ¼". The germination should be stopped at this point, since if the wheat is allowed to germinate further, the resulting cereal will not have a proper flavor but will have a "grass" or "green" taste. If the germination is not brought to the above point, the beneficial processes within the grain will not be completed, and the desired features and properties of the cereal will not be fully or sufficiently realized.

When the germination reaches the point specified above, it is stopped by drying the wheat. Drying should be quick but not so quick as to produce roasting of the grain. I prefer to dry the wheat at such a temperature as to preserve its natural color.

Thereupon, the dried wheat is ground into flour. The grinding should be as fine as practicable, since coarse grinding does not bring out the desired matters, and much of it would remain locked in and would not be subjected to further beneficial treatment. Also the fine grinding is important for digestibility of the final product, particularly if it is used for feeding babies. It is very important to appreciate that no part of the grain should be discarded, and that the conventional practice of discarding the germ, and all or a portion of the bran or husk should not be followed.

The flour produced may be stored and marketed as a finished product. However, I prefer to complete the process and to bring out a completely prepared cereal which may be eaten without any further cooking or even heating.

Below is described the preferred method of preparing the cereal. The following description refers to the preparation of a small quantity of cereal such as may be done on a conventional kitchen stove. It will be understood however that adaptations necessary for a large quantity production may be easily made in accordance with the requirements of the art.

In accordance with the invention, I mix the flour produced as specified above with an equal quantity of lukewarm water (by volume) and stir it thoroughly to pancake dough consistency or slightly thicker. The mixture should be stirred until it is free from lumps. Thereupon the dough is cooked on a very slow fire either in a water bath (double boiler), with a plate under the cooking vessel or with the use of a similar precaution to prevent burning, and overheating of the dough. With the use of a gas stove, the gas should be turned to its lowest point. Slow cooking is also important in order to allow sufficient time for the enzyme developed in the grain during germination to act on the starch retained in the flour and present in the dough. The dough should not be brought to boiling temperature, and 8 hrs. of very slow cooking is preferable. When cooking in small vessels, keeping the vessel tightly covered prevents burning of the bottom portion of its contents. At the beginning of cooking the mass should be stirred every 15 or 20 minutes, but after the mass starts bubbling stirring once every two hours is sufficient. The temperature during cooking is approximately 180–200 degrees F. depending on whether it is measured with the lid on or off. During cooking drops of oil begin to gather on the surface, and the dough changes its color from greyish tan to light brown and then gradually to dark brown when cooking is completed.

After cooking, the resulting product is canned in a manner well known in the art, and may be stored indefinitely.

Taken out of the can the prepared cereal has the appearance and consistency of commercial apple butter and in fact it has a taste rather similar to it but is more substantial. It is sweet and tastes somewhat better when eaten cold, but may be heated to lukewarm temperature if desired. Unlike most other cereals its palatability does not depend on addition of milk or cream, and therefore it may be eaten with or without milk or cream.

My improved cereal may be eaten straight, or with milk, used as pie filling, a spread on bread, pudding, addition to bread or muffin dough and in numerous other ways. Cooked to produce a thicker mass suitable for cutting into pieces and coated with chocolate, my cereal may be eaten as candy.

The increased vitamin and mineral content of the cereal (due to the retention of the usually discarded germ and husk) make my cereal a more balanced and satisfying food, and therefore human system does not have to take more food simply to get enough required vitamins, and minerals with excess of starches and sugar. Thus my improved cereal gives strong and sufficient nutrition and does not result in fattening of an individual.

One of the noticeable results of its consumption is surprising lightness, easiness of digestive process and absence of rumbling in the stomach or intestines. When eaten at late supper it does not interfere with sleep. I believe this to be due to the fact that in my improved cereal the digestive process is partially accomplished during the above disclosed method of preparation and particularly the germination of the wheat and the slow cooking of the cereal, and therefore the system is not called upon to deliver large quantities of various digestive juices. Thus overworking of many juice-producing glands is prevented. By actual tests I have also found that in cases of certain stomach maladies such as nervous indigestion my cereal has a certain quieting or healing effect.

My improved cereal has a very mild laxative effect which is beneficial in many instances. However I found that this effect is noticeable only when it is beneficial i. e. when it is required by the system which has difficulty to operate normally otherwise, but is not particularly noticed in case of a normal system which automatically adapts itself to this effect.

It should be particularly appreciated that the slightly laxative effect in my improved cereal does not affect its nutrition value as may be the case with the Graham bread or the so-called "whole wheat" bread which have laxative effect but lack pre-digested properties. With the latter combination of properties the bread passes through the intestines more rapidly and before the system had a chance to extract all the nutritive matter that the bread was supposed to yield. By combining the predigested feature with the slight laxative effect I have completely eliminated the above disadvantage. I am aware of the fact that there is at the present time on the market a number of the so-called "malted" cereals or "wheat germ" cereals. However such malted cereals are usually made by addition to a cereal product of malt, malted barley flour, or roasted malted grain. I do not propose the use of such methods and products. Also addition of wheat germ (that is a portion of the grain containing the germ and removed in milling before the wheat is finally ground in order to improve the keeping qualities of the flour) is a different process and it produces a different product.

There is thus provided an improved prepared cereal whereby the objects of the present invention listed above and numerous additional advantages are attained.

I claim:

1. A method of making a prepared wheat cereal, comprising the steps of providing a quantity of wheat, germinating the entire quantity thereof, drying the wheat when the root sprout reaches the length of appr. ½" and the stem reaches the length of approximately ¼", grinding the dried wheat into flour without removal of any portion of the wheat grain particularly the root sprouts, mixing the flour with water, cooking the mixture, and thereupon canning the resulting product.

2. A method of making a prepared wheat cereal for canning, comprising the steps of providing a quantity of wheat, germinating the entire quantity thereof, drying the wheat by slow heat when the root sprout reaches the length of appr. ½" and the stem reaches the length of approximately ¼", grinding the dried wheat into flour without removal of any portion of the wheat grain particularly the root sprouts, mixing the flour with water to consistency of pancake dough and adding salt for taste, cooking the dough on slow heat, and canning the resulting product.

3. A method of making a prepared cereal, said method comprising the steps of providing a quantity of wheat, germinating the entire quantity thereof to have the root sprouts reach the length of approximately ½" and the stem reach the length of approximately ¼", drying the germinated wheat and grinding it into flour without removing any portions of the dried germinated grain particularly the root sprouts, mixing the flour so produced with water to pancake dough consistence and cooking the dough on a slow fire, and cooling the resulting product.

4. The method defined in claim 3 with cooking being carried to bring the product on cooling to consistence insuring that pieces of the product will retain their shape, and including the steps of cutting the product into pieces and chocolate-coating said pieces.

KASPER KEHETIAN.

REFERENCES CITED

The following references are of record in the file of this patent:

UNITED STATES PATENTS

| Number | Name | Date |
| --- | --- | --- |
| 776,471 | Jackson | Nov. 29, 1904 |
| 1,410,973 | Wahl | Mar. 28, 1922 |
| 1,950,418 | Schreier | Mar. 13, 1934 |
| 2,310,028 | Gustavson | Feb. 2, 1943 |

FOREIGN PATENTS

| Number | Country | Date |
| --- | --- | --- |
| 7,955 | Great Britain | of 1904 |
| 11,732 | Great Britain | of 1886 |
| 17,406 | Great Britain | of 1896 |